(12) United States Patent
Chang et al.

(10) Patent No.: US 11,055,082 B2
(45) Date of Patent: *Jul. 6, 2021

(54) UNIFIED UPDATE TOOL FOR MULTI-PROTOCOL NETWORK ADAPTER

(71) Applicant: International Business Machines Corporation, Armonk, NY (US)

(72) Inventors: Tai-chien D. Chang, Austin, TX (US); Baltazar De Leon, III, Austin, TX (US); Marcus B. Grande, Pflugerville, TX (US); Brian W. Hart, Austin, TX (US); Jaime F. Nualart, Austin, TX (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,368

(22) Filed: Sep. 24, 2018

(65) Prior Publication Data
US 2019/0026100 A1 Jan. 24, 2019

Related U.S. Application Data

(63) Continuation of application No. 15/065,135, filed on Mar. 9, 2016, now Pat. No. 10,095,502, which is a
(Continued)

(51) Int. Cl.
*G06F 8/65* (2018.01)
*G06F 8/654* (2018.01)

(52) U.S. Cl.
CPC ............... *G06F 8/65* (2013.01); *G06F 8/654* (2018.02); *G06F 8/66* (2013.01)

(58) Field of Classification Search
CPC ........................................................ G06F 8/65
(Continued)

(56) References Cited

U.S. PATENT DOCUMENTS 7,313,791 B1 12/2007 Chen et al.
7,904,895 B1 3/2011 Cassapakis et al.
(Continued)

OTHER PUBLICATIONS

Cecilio, José, and Pedro Furtado. "Architecture for uniform (re) configuration and processing over embedded sensor and actuator networks." IEEE transactions on industrial informatics 10.1 (2013): pp. 53-60. (Year: 2013).*
(Continued)

*Primary Examiner* — Satish Rampuria
(74) *Attorney, Agent, or Firm* — Mark Bergner

(57) ABSTRACT

A method and technique for updating firmware on a multi-protocol network adapter includes reading parameter values for a firmware update of a multi-protocol network adapter that specify classes of behavior for conducting the firmware update of the multi-protocol network adapter. An update tool determines a reset type defining a type of reset needed to activate the firmware update on the network adapter based on the parameter values, sends a message to the network adapter indicating that a firmware update process is beginning, sends a write request to the network adapter to write the firmware update to select communication protocol functions, and sends a reset request to select communication protocol functions to activate the firmware update using the reset type according to the parameter values.

19 Claims, 6 Drawing Sheets

Related U.S. Application Data continuation of application No. 14/065,043, filed on Oct. 28, 2013, now Pat. No. 9,298,446.

(58) Field of Classification Search
USPC .................................................. 717/168–178
See application file for complete search history.

(56) References Cited

U.S. PATENT DOCUMENTS

| | | | |
|---|---|---|---|
| 8,386,659 | B2 | 2/2013 | Jung et al. |
| 8,462,961 | B1* | 6/2013 | Bywaters ............ H04L 12/1895 381/77 |
| 8,555,273 | B1* | 10/2013 | Chia ....................... G06F 8/654 717/173 |
| 2003/0140134 | A1 | 7/2003 | Swanson et al. |
| 2003/0233493 | A1 | 12/2003 | Boldon et al. |
| 2004/0143828 | A1* | 7/2004 | Liu ......................... G06F 8/654 717/168 |
| 2004/0205745 | A1 | 10/2004 | Piazza |
| 2007/0067820 | A1 | 3/2007 | Cha |
| 2008/0127165 | A1* | 5/2008 | Mullis ................... G06F 9/4415 717/173 |
| 2011/0154313 | A1* | 6/2011 | Nolterieke .............. G06F 8/658 717/170 |
| 2012/0198434 | A1 | 8/2012 | Dirstine et al. |
| 2013/0013758 | A1 | 1/2013 | Lopes |
| 2013/0074061 | A1 | 3/2013 | Averbuch et al. |
| 2013/0086571 | A1 | 4/2013 | Dasari et al. |
| 2013/0151841 | A1* | 6/2013 | McGraw ............. G06F 11/3006 713/100 |
| 2016/0196131 | A1* | 7/2016 | Searle ..................... H04L 29/06 717/173 |

OTHER PUBLICATIONS

Konstantinou, Alexander V., Danilo Florissi, and Yechiam Yemini. "Towards self-configuring networks." Proceedings DARPA Active Networks Conference and Exposition. IEEE, 2002.pp. 1-14 (Year: 2002).*

Kallahalla, Mahesh, et al. "SoftUDC: A software-based data center for utility computing." Computer 37.11 (2004): pp. 38-46. (Year: 2004).*

Brown, S., and C. J. Sreenan. "Updating software in wireless sensor networks: A survey." Dept. of Computer Science, National Univ. of Ireland, Maynooth, Tech. Rep (2006): pp. 1-14. (Year: 2006).*

Mudagal, Vishwas. "Methods for upgrading reconfigurable hardware use in mobile phones." Freescale Semiconductor, Inc., White paper (2006).pp. 1-13 (Year: 2006).*

Cheng, Anyu, et al. "Design and Implementation of Online Upgrade Software for Vehicle ECU Based on HIS Standard." vol. 3, No. 1, 2016 pp. 98-105 (Year: 2016).*

Zhou, Ningqun, et al. "On-line Upgrade Method of DSP Program Based on Controller Area Network Bus." 2020 Chinese Automation Congress (CAC). IEEE, 2020.pp. 327-332 (Year: 2020).*

Ajmani, Sameer. "A review of software upgrade techniques for distributed systems." Date: Aug. 7, 2002: pp. 1-19. (Year: 2002).*

Kallahalla, Mahesh, et al; SoftUDC: A Software-Based Data Center for Utility Computing; IEEE Computer Society 37.11 (2004); pp. 38-46.

Guijarro, Manuel, et al.; Experience and lessons learnt from running high availability databases on network attached storage; Journal oh Physics: Conference Series vol. 119, No. 4; IOP Publishing; 2008; pp. 1-10.

Brown, S., et al; Updating Software in Wireless Sensor Networks: A Survey; Dept. of Computer Science; National Univ. of Ireland; Maynooth; Tech. Rep. UCC-CS-2006-13-07; 2006; pp. 1-14.

Open Mobile Alliance, Ltd.; Firmware Update Management Object; Candidate Version 1.0; Jun. 15, 2006; pp. 1-32.

Nilsson, Dennis, K, et al.; Secure Firmware Updates over the Air in Intelligent Vehicles; ICC 2008 Workshop Proceedings; IEEE Communications Society; 2008; pp. 380-384.

Liu, Leslie, et al.; Cloud Service Portal for Mobile Device Management; IEEE International Conference on E-Business Engineering; 2010; pp. 474-478.

* cited by examiner

UNIFIED UPDATE TOOL FOR MULTI-PROTOCOL NETWORK ADAPTER

BACKGROUND

A network adapter is a piece of computer hardware providing an interface between a computing system and a network, such as a local area network (LAN) or storage area network (SAN). The network adapter enables computers to communicate over a network by controlling the transmission and receiving of data therebetween. A network adapter generally includes a control unit for controlling different processes performed by the adapter and firmware running on the adapter. A device driver enables a local operating system to communicate with the adapter. Network adapters may also be multi-protocol or converged adapters enabling communications according to different functions/protocols. For example, a single adapter may include both Fibre Channel (FC) host bus adapter and Ethernet network interface card (NIC) functionality. However, multi-protocol adapters are generally complex to manage and update (e.g., applying a firmware update).

BRIEF SUMMARY

According to one aspect of the present disclosure a method and technique for updating a multi-protocol network adapter is disclosed. The method includes reading parameter values for a firmware update of a multi-protocol network adapter that specify classes of behavior for conducting the firmware update of the multi-protocol network adapter. An update tool determines a reset type defining a type of reset needed to activate the firmware update on the network adapter based on the parameter values, sends a message to the network adapter indicating that a firmware update process is beginning, sends a write request to the network adapter to write the firmware update to select communication protocol functions, and sends a reset request to select communication protocol functions to activate the firmware update using the reset type according to the parameter values.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
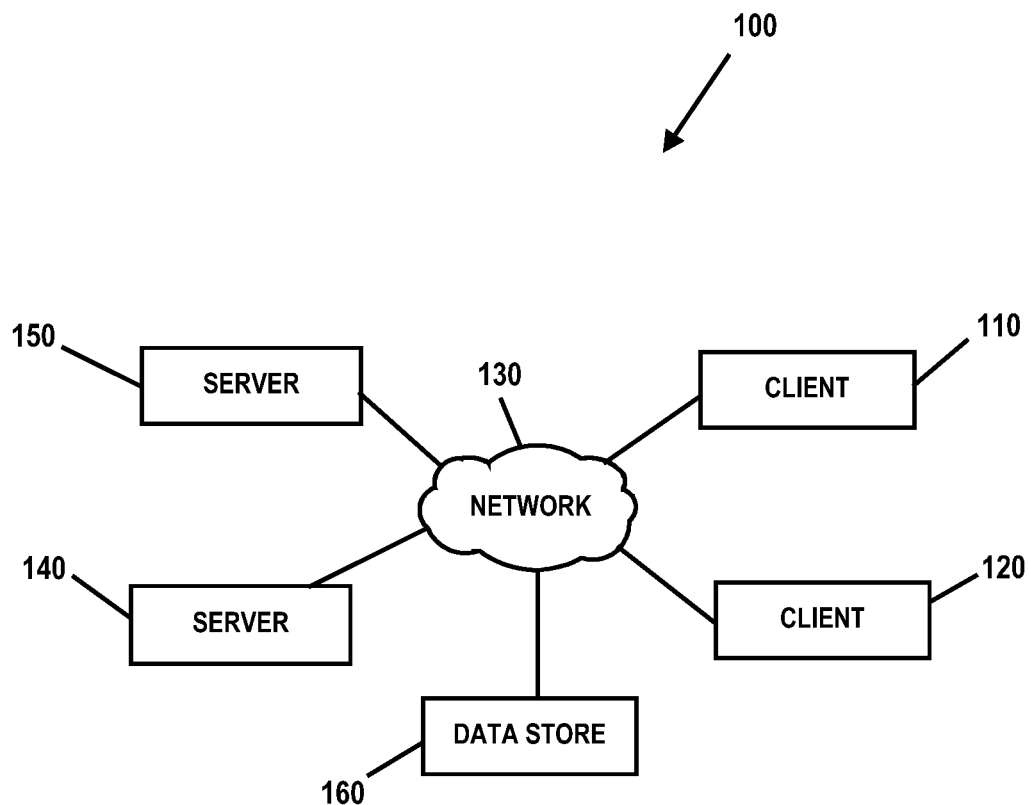
FIG. 1 is an embodiment of a network of data processing systems in which the illustrative embodiments of the present disclosure may be implemented.

Embodiments of the present disclosure provide a method, system and computer program product for updating a multi-protocol network adapter. For example, in some embodiments, the method and technique includes: reading, by an update tool executed by a processor unit of a host, parameter values for a firmware update of a multi-protocol network adapter to: determine an update scope indicating one or more functions of the network adapter affected by the firmware update; and determine a write scope indicating which of the one or more functions of the network adapter should receive a write request for writing the firmware update to the network adapter. The update tool is operable to: send a message indicating to the one or more functions based on the update scope that a firmware update process is beginning; send a write request to write the firmware update to the one or more functions based on the write scope; send a reset request to reset the one or more functions to activate the firmware update; and send a message indicating to the one or more functions that the firmware update process is completed. Thus, embodiments of the present disclosure provide a firmware update tool for updating firmware of a multi-protocol network adapter that is extensible to various combinations of update procedures. A number of defined parameters corresponding to the particular adapter and/or firmware update for the designated adapter may be read/determined by the update tool and used to control the process of updating the firmware on the adapter. The parameters may be statically defined and/or dynamically determined at firmware update/run-time.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
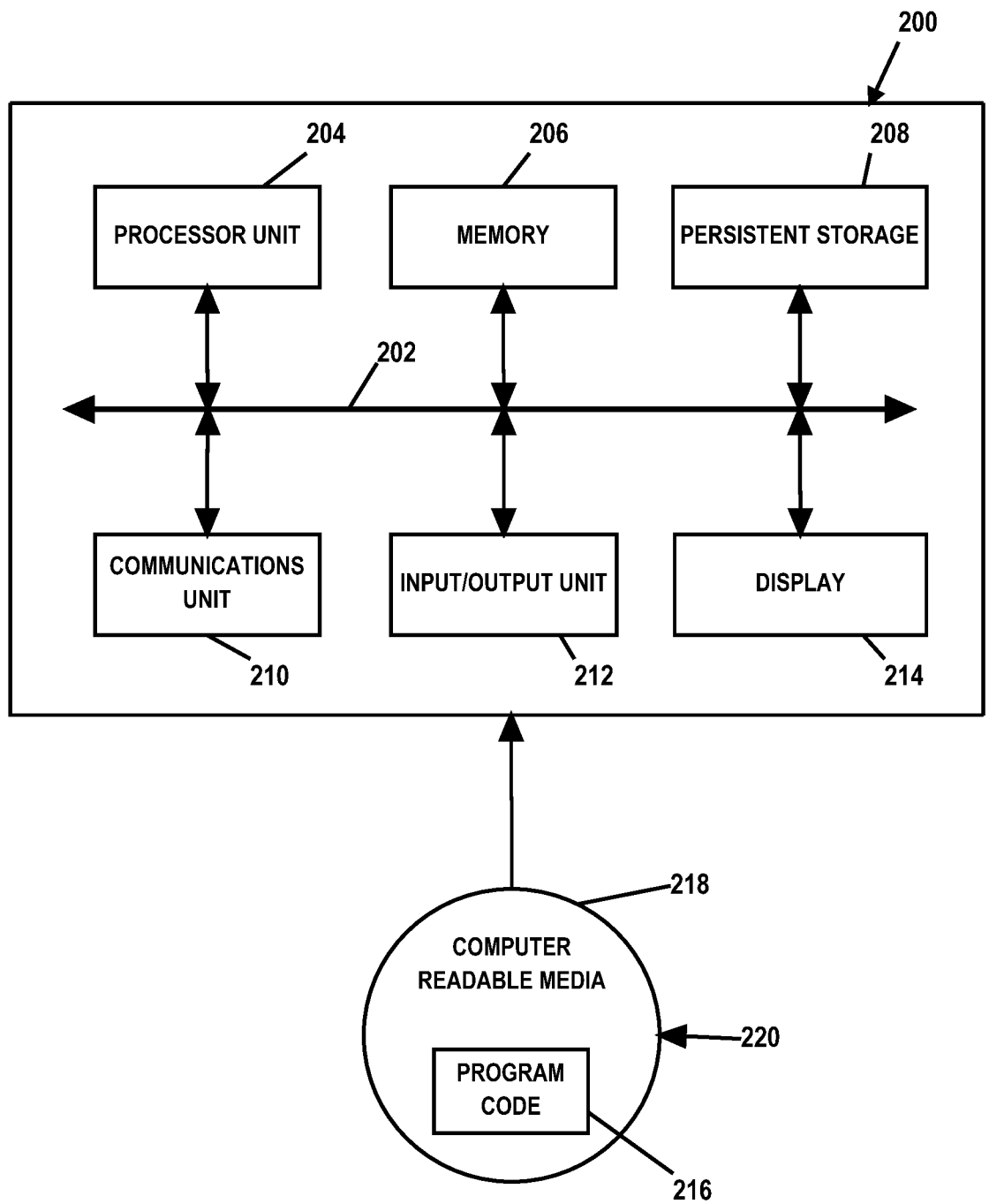
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for updating a multi-protocol network adapter according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
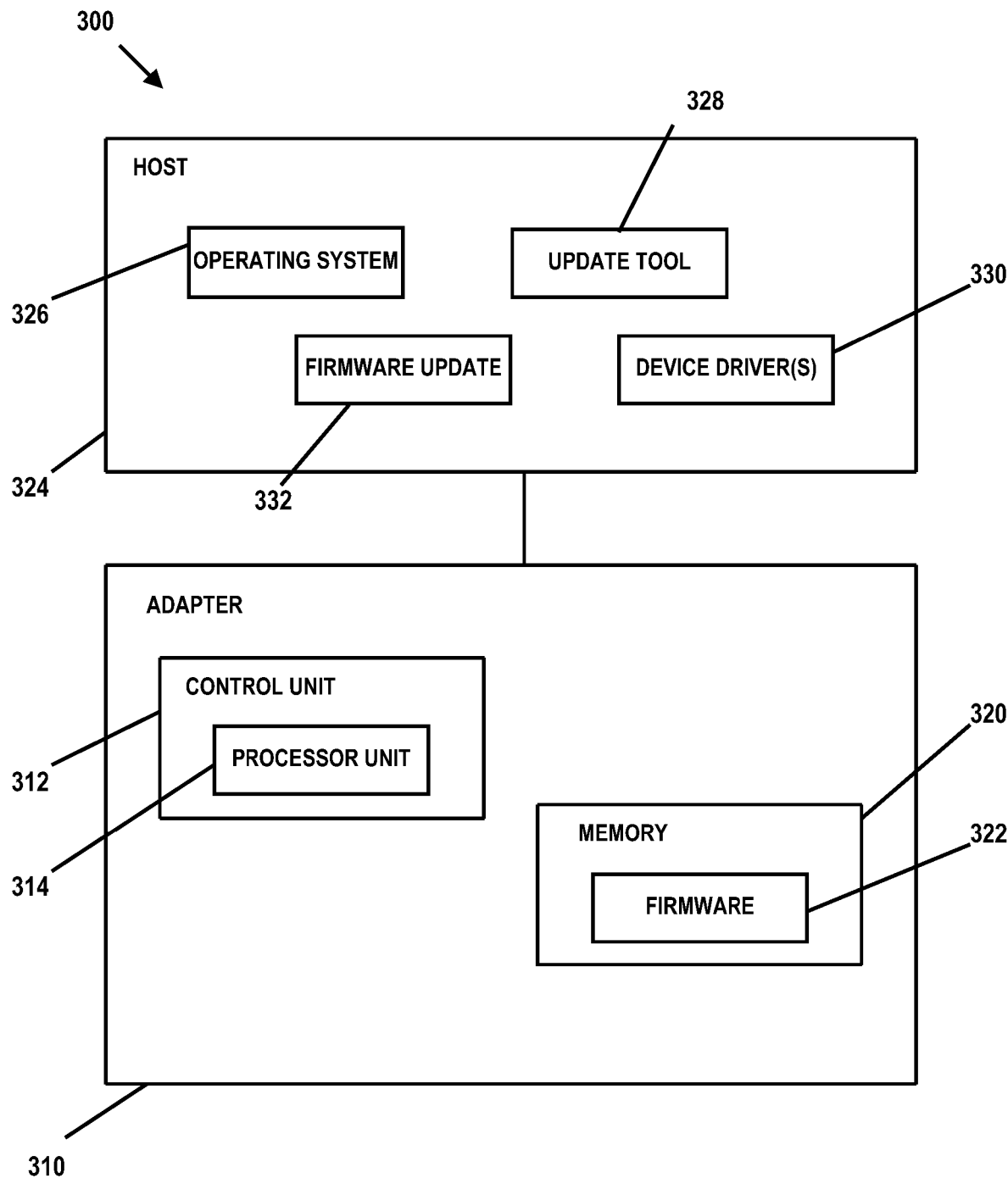
FIG. 3 is a diagram illustrating an embodiment of a computing environment in which illustrative embodiments of a unified update tool for updating firmware of a multi-protocol network adapter according to the present disclosure may be implemented.

FIG. 3 is a diagram illustrating a computing environment in which an embodiment of a system 300 for updating a multi-protocol network adapter according to the present disclosure may be implemented. In the illustrated embodiment, system 300 includes a network adapter 310 such as, but not limited to, communications unit 210, having a control unit 312 with a processor unit 314, and a memory 320 having firmware 322. Control unit 312 controls the different processes and functions performed by adapter 310. For example, in the illustrated embodiment, control unit 312 includes processor unit 314 that may be used to execute instructions of firmware 322 for controlling adapter 310 functionality. However, control unit 312 may also comprise an application-specific integrated chip (ASIC). Memory 320 may comprise an electrically erasable programmable read-only memory (EEPROM) residing on an EEPROM chip. In FIG. 3, a host system 324 (e.g., such as client 110 and/or server 140) includes an operating system 326, an update tool 328 and a device driver 330. In some embodiments, update tool 328 is used to update and/or modify firmware 322 of adapter 310 (e.g., a firmware update 332 in the form of a plain-text ASCII file, binary file, or other configuration file format). Update tool 328 may be communicated to host 324 over a communications network, stored on host 324 from a disk or other computer readable medium, or otherwise made available on host 324 for updating, modifying and/or performing maintenance functions to firmware 322 or other operating software of adapter 310. Update tool 328 may be implemented in any suitable manner using known techniques that may be hardware-based, software-based, or some combination of both. For example, update tool 328 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Device driver 330 provides an interface between operating system 326 and adapter 310. Device driver 330 may comprise a driver instance for each function of adapter 310.

Embodiments of the present disclosure provide update tool 328 that is adapter-agnostic. For example, in some embodiments, update tool 328 uses a set of statically-defined parameters that are specified to describe classes of behavior such that adapters with differing firmware download requirements can be supported with a single, common download tool (i.e., tool 328) without the need for a tool update. For example, in some embodiments, the following static parameters can be used/read by tool 328 (with exemplary parameter values) to specify/conduct firmware update procedures for various classes of adapters (e.g., read from firmware update 332 and/or a configuration file associated with the adapter or the firmware update):

UPDATE_SCOPE—Defining which functions (or protocol functionalities) are affected by a firmware update (VALUES: 1|ALL)

WRITE_SCOPE—Defining which functions should receive a firmware WRITE request/command/message (VALUES: 1|ALL)

RESET_TYPE—Defining what type of reset is required to activate the firmware update (VALUES: PCI_FUNDAMENTAL, PCI_HOT, PCI_FLR, ADAP_SPECIFIC)

RESET_SCOPE—Defining which functions should receive a RESET command/message following the firmware write (VALUES: 1|ALL). Note that for "ALL" values, each function will be called with a sequence count so that the driver knows how far along it is in the reset process (e.g., "1 of 4," "2 of 4," etc., for four functions)

UPDATE_FUNCTION_NUM—Defining whether the firmware update should occur via a specific function number identifier of the adapter (VALUES; <pci_function_num>|ANY), where "pci_function_num" is a designation identifying a particular functional component of the adapter RESOURCE_TYPE—For a multi-protocol adapter, defining whether the adapter update should occur through a function associated with a particular protocol, such as Fibre Channel over Ethernet (FcoE), the network function (NIC), the iSCSI TOE function, etc. (VALUES: <protocol_indicator>|ANY)

MIN_SIBLINGS—For a multifunction adapter, defining whether the device driver managing sibling functions should be loaded in order for proper function of the adapter after a firmware update (VALUES: <number_of_functions_required>|ANY)

In some instances, the adapter may comprise a shared flash memory containing the firmware image for all functions. In other instances, the adapter may comprise one shared flash memory across NIC functions with another shared flash for the FC functions. In yet other instances, one shared flash memory may be used for NIC functions, while each of a plurality of FC functions has its own flash memory. Thus, the WRITE_SCOPE attribute is used to indicate which functions should receive a firmware WRITE request (e.g., if one shared flash for all functions, a WRITE request may be made to one function and will be applicable to all functions; in other instances, a WRITE request may need to be issued to multiple, different functions).

The RESET_TYPE values of "PCI_FUNDAMENTAL," "PCI_HOT" and "PCI_FLR" (function level reset) may represent PCI express resets, and the "ADAP_SPECIFIC" designation may represent a reset that is adapter-specific. It should be understood that the type of reset may vary based on the adapter and/or functions of the adapter.

Based on the defined parameter values, the following phases of the update procedure are implemented/carried out by update tool 328:

BEGIN phase—indication to all functions in the UPDATE_SCOPE that firmware update is beginning WRITE phase—issue the firmware write request to one or more of the adapter functions based on WRITE_SCOPE RESET phase—issue a reset request to one or more adapter functions to activate the new firmware image based on RESET_SCOPE DONE phase—indication that firmware update is completing (each function's driver instance performs any final cleanup/prep work to resume normal operations)

Figure 4:
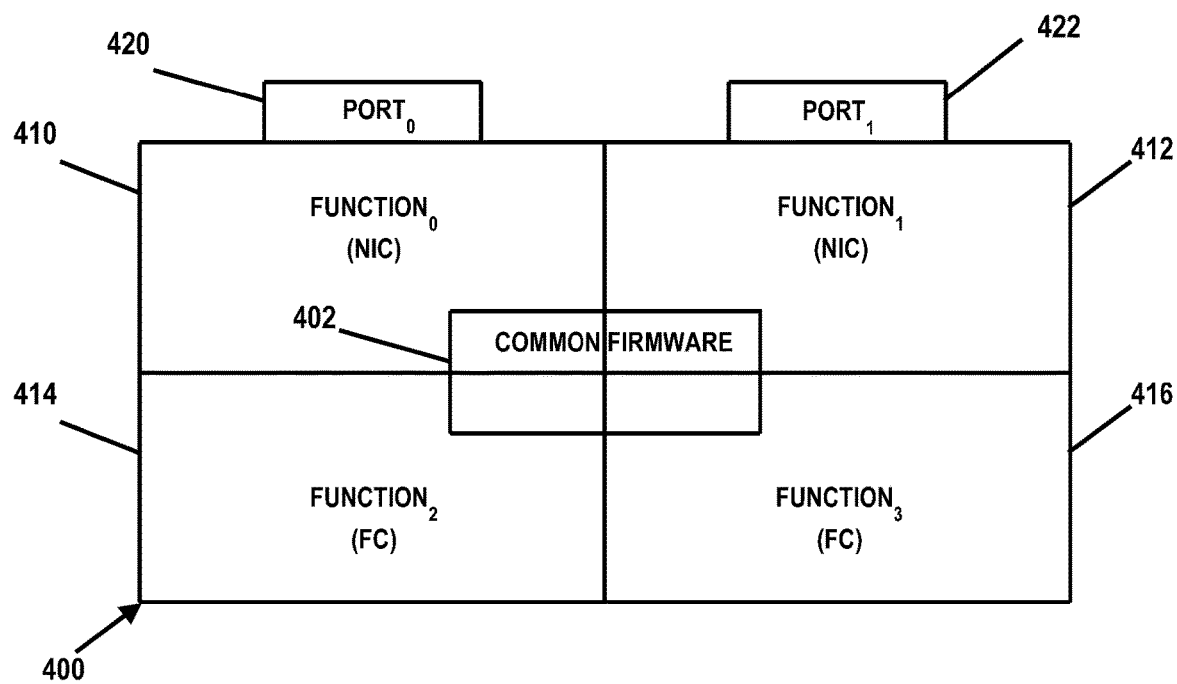
FIG. 4 is a diagram illustrating an embodiment of a multi-protocol adapter in which illustrative embodiments of the update tool according to the present disclosure may be used for updating firmware thereon.

FIG. 4 is a diagram illustrating an embodiment of an adapter 400 in which illustrative embodiments of the present disclosure may be used to update firmware thereon. In the illustrated embodiment, adapter 400 comprises a Fibre Channel over Ethernet (FCoE) Converged Network Adapter (CNA) where there is a single firmware image 402 shared across all four functions of adapter 400 (e.g., $Function_0$ (NIC) 410, $Function_1$ (NIC) 412, $Function_2$ (FC) 414 and $Function_3$ (FC) 416). In the illustrated embodiment, $Function_0$ (NIC) 410 and $Function_2$ (FC) 414 share a port 420 of adapter 400, while $Function_1$ (NIC) 412 and $Function_3$ (FC) 416 share a port 422 of adapter 400. In the illustrated embodiment, a firmware update (e.g., update 330) affects all functions of adapter 400. In order to activate a new firmware image, in this example, presume that the RESET type for adapter 400 may vary from an adapter-specific reset to a PCI HOT reset depending on the contents of the firmware image relative to what is currently installed in adapter 400. The following combination of parameter attributes could be used to describe/define the update for adapter 400:

UPDATE_SCOPE=ALL (e.g., all functions affected by update)

WRITE_SCOPE=1 (e.g., since firmware shared by all functions, a WRITE request can be issued to any of the functions—but only one is needed)

RESET_TYPE=PCI_HOT (e.g., needs PCI hot reset)

RESET_SCOPE=1 (e.g., only one function needs to receive the RESET message)

UPDATE_FUNC_NUM=ANY (e.g., firmware can be updated using any of the function designations (e.g., $Function_0$, $Function_1$, $Function_2$ or $Function_3$))

RESOURCE_TYPE=ANY (e.g., update can occur through any function/protocol)

MIN_SIBLINGS=ANY (e.g., doesn't matter whether any function driver instances are currently configured)

In this example, an update sequence might result in the following messages being sent from update tool 328 to the driver (e.g., driver 330) of adapter 400:

1. BEGIN message to $Functions_{0-3}$ to prepare for an update;
2. WRITE message to $Function_0$, for example, to write the new firmware (e.g., update 332) out to adapter 400 (e.g., can write to any function based on WRITE_SCOPE, UPDATE_FUNC_NUM and RESOURCE_TYPE);
3. RESET message to $Function_0$, for example, with RESET_TYPE=PCI_HOT (e.g., can send RESET message to any function based on RESET_SCOPE). Sequence count is "1 of 1" (only one is needed); and
4. DONE message to $Functions_{0-3}$ to conclude firmware download sequence.

Note that although a particular adapter firmware update may not require a PCI_HOT reset, in some embodiments, a PCI_HOT reset may be selected to cover multiple scenarios or worst-case conditions.

Figure 5:
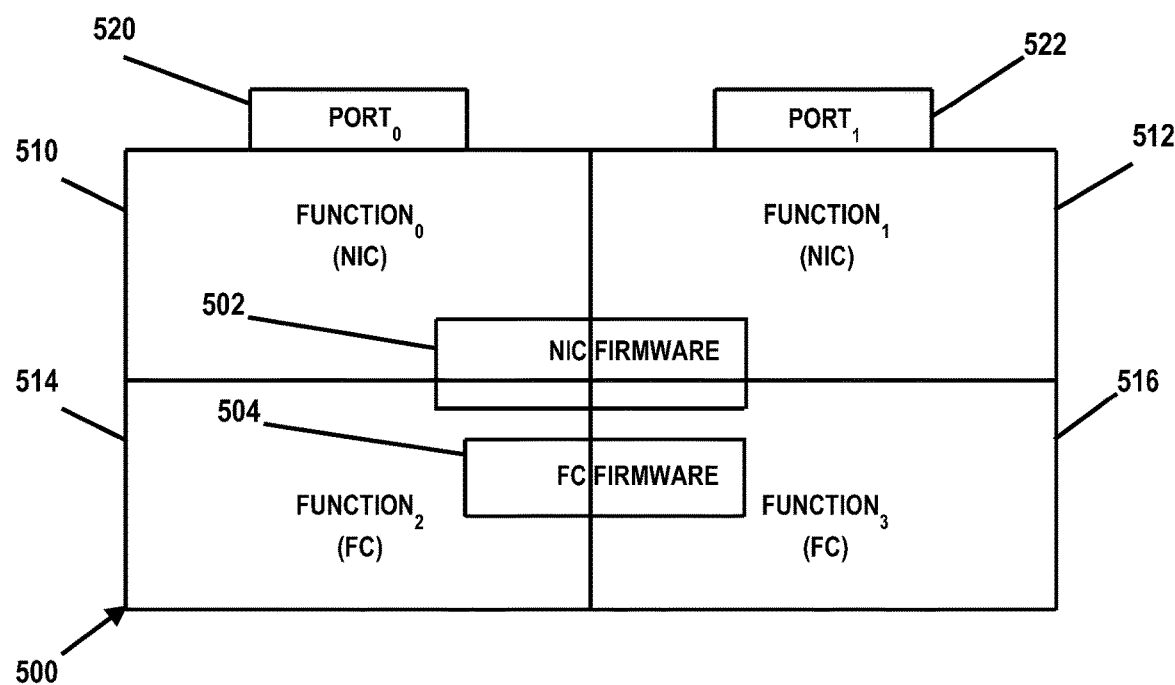
FIG. 5 is a diagram illustrating another embodiment of a multi-protocol adapter in which illustrative embodiments of the update tool according to the present disclosure may be used for updating firmware thereon.

FIG. 5 is a diagram illustrating another embodiment of an adapter 500 in which illustrative embodiments of the present disclosure may be used to update firmware thereon. In the illustrated embodiment, a NIC firmware image 502 is shared across all four functions of adapter 500 (e.g., $Function_0$ (NIC) 510, $Function_1$ (NIC) 512, $Function_2$ (FC) 514 and $Function_3$ (FC) 516), and a FC firmware image 504 is shared across FC functions (e.g., $Function_2$ (FC) 514 and $Function_3$ (FC) 516). In the illustrated embodiment, $Function_0$ (NIC) 510 and $Function_2$ (FC) 514 share a port 520 of adapter 500, while $Function_1$ (NIC) 512 and $Function_3$ (FC) 516 share a port 522 of adapter 500. In this example, NIC firmware image 502 affects all four functions of adapter 500 but in a non-uniform way. A reset of the NIC firmware 502 is a full reset of the NIC functions. The FC functions have a shared FC firmware image 504 independent of the NIC firmware 502. A reset of the NIC firmware appears to the FC functions like a LINK DOWN event where the transport is currently unavailable, and it does not cause a full reset of the FC functions. In this example, presume the following:

- The NIC and FC firmware images are independent in the adapter flash memory;
- Only adapter-specific resets are needed for the new firmware image to be activated for the NIC and FC functions;
- A firmware update may update just the NIC firmware image, just the FC firmware image, or both images;
- Only the FC function will be used to update the firmware;
- Resetting the NIC firmware does not automatically reset the FC function nor vice versa. However, as both the NIC and FC firmware can be updated via the FC driver associated with the FC function, the NIC firmware can also be reset via the FC driver;
- The NIC and FC firmware can be updated simultaneously from any one function; and
- Presume a firmware download is performed that updates just the FC firmware.

In this example, the following combination of attributes could be used to describe/define the update for adapter 500:

UPDATE_SCOPE=ALL (e.g., affects all functions)
WRITE_SCOPE=1 (e.g., only need to write to one function)
RESET_TYPE=ADAP_SPECIFIC (e.g., an adapter-specific reset is needed)
RESET_SCOPE=ALL (e.g., all functions should receive a RESET message)
UPDATE_FUNC_NUM=3 (e.g., select $Function_3$ for the WRITE message)
RESOURCE_TYPE=FC (e.g., only write to the FC function, not the NIC function)
MIN_SIBLINGS=ANY An update sequence might result in the following messages sent from update tool 328 to the device driver 330:

1. BEGIN message to $Functions_{0-3}$ to prepare for an update (affects all functions);
2. WRITE message to $Function_3$ to write the new firmware out to adapter 500 (only FC firmware is being updated, and only need to issue WRITE request to one function based on WRITE_SCOPE, and the WRITE message should be sent to the FC function using the $Function_3$ designation);
3. RESET message to $Functions_{0-3}$ with RESET_TYPE=ADAP_SPECIFIC (sequence count for each function: "1 of 4," "2 of 4," etc.) (reset to all functions); and
4. DONE message to $Functions_{0-3}$ to conclude firmware download sequence.

Note that although this particular adapter firmware update may not affect the NIC functions, in a statically defined scheme, a the worst-case scenario may be selected such that all functions need to be reset. In some instances, a reset of all functions may not be needed.

In some embodiments, a combination of a few statically-defined parameters along with several dynamically exchanged parameters can be specified that describe classes of behavior for an adapter. For example, in some embodiments, certain parameters may be communicated to update tool 328 at runtime (i.e., at firmware update runtime) to enable firmware download support for the particular adapter by update tool 328.

For example, in some embodiments, using a dynamic, run-time exchange or parameter information, the following static parameters (with example values) can be used to specify firmware update procedures for various classes of adapters:

UPDATE_SCOPE—Indicating which functions are affected by a firmware update (VALUES: 1|ALL)
WRITE_SCOPE—Indicating which functions should receive a firmware WRITE request (VALUES: 1|ALL)
MIN_SIBLINGS—For a multifunction adapter, an indication of whether the device driver managing sibling functions must be loaded in order for proper function of the adapter after a firmware update (VALUES: <number_of_functions_required>|ANY In addition to the above static parameters, a set of parameters are also exchanged during the adapter update procedure. The following are four phases of the update procedure and the parameters passed between the update application and the driver during the update sequence:

BEGIN phase—Indication to all functions in the UPDATE_SCOPE that firmware update is beginning. Each function returns a WRITE_SPT flag indicating whether that function supports firmware download WRITE phase—Issue the firmware write request to one or more of the adapter functions. Each function returns a RESET_TYPE flag indicating the type of reset required to activate the new firmware. Options may be PCI_FUNDAMENTAL, PCI_HOT, PCI_FLR, ADAP_SPECIFIC, etc. In addition, a 'hw_flags' field is provided in the response that allows for any hardware-specific information to be passed between the various functions on the adapter RESET phase—Issue a reset request to one or more adapter functions to activate the new firmware image. The RESET_TYPE returned from WRITE is echoed back to each function along with 'hw_flags' returned from the WRITE request DONE phase—Indicates that firmware update is completing (each function's driver performs any final cleanup/prep work to resume normal operations)

As an example, referring to adapter 400 of FIG. 4, firmware image 402 is shared across all four functions of adapter 400 (e.g., $Function_0$ (NIC) 410, $Function_1$ (NIC) 412, $Function_2$ (FC) 414 and $Function_3$ (FC) 416). In the illustrated embodiment, a firmware update (e.g., update 330) affects all functions of adapter 400. In order to activate a new firmware image, in this example, presume that the RESET type for adapter 400 may vary from an adapter-specific reset to a PCI_HOT reset depending on the contents of the firmware image relative to what is currently installed in adapter 400. In addition, presume that there are two types of adapter-specific resets—"firmware reset" and "initialize function." The following combination of attributes could be used to describe adapter 400:

UPDATE_SCOPE=ALL (e.g., all functions affected by update)
WRITE_SCOPE=1 (e.g., only need to write to one function)
MIN_SIBLINGS=ANY In this example, an update sequence might result in the following messages being sent from update tool 328 to device driver 330 for adapter 400:

1. BEGIN message to $Functions_{0-3}$ to prepare for an update;
2. Each function returns WRITE_SPT set to TRUE in the BEGIN response, indicating that a firmware WRITE can occur on any one of the functions;

3. Update tool 328 sends WRITE message to Function$_0$ to write the new firmware out to the adapter (e.g., can select any of the Functions$_{0-3}$);
4. WRITE response from Function$_0$ indicating ADAP_SPECIFIC type of reset needed; 'hw_flags' used to further indicate "firmware reset" or "initialize function" reset types;
5. Each function's driver instance in the UPDATE_SCOPE receives a RESET request with the RESET_TYPE set to ADAP_SPECIFIC; 'hw_flags' are also echoed back to each function so the function knows what ADAP_SPECIFIC type of reset to perform; and
6. DONE message to Functions$_{0-3}$ to conclude firmware download sequence.

Note that this dynamic approach accommodates scenarios where the reset type and scope can vary depending on the firmware image contents and/or the version of firmware currently installed on the adapter.

As another example of a dynamic approach according to the present disclosure, referring to adapter 500 of FIG. 5, NIC firmware image 502 is shared across all four functions of adapter 500 (e.g., Function$_0$ (NIC) 510, Function$_1$ (NIC) 512, Function$_2$ (FC) 514 and Function$_3$ (FC) 516), and FC firmware image 504 is shared across FC functions (e.g., Function$_2$ (FC) 514 and Function$_3$ (FC) 516). In this example, NIC firmware image 502 affects all four functions of adapter 500 but in a non-uniform way. A reset of the NIC firmware 502 is a full reset of the NIC functions. The FC functions have a shared FC firmware image 504 independent of the NIC firmware 502. A reset of the NIC firmware appears to the FC functions like a LINK DOWN event where the transport is currently unavailable, and it does not cause a full reset of the FC functions. In this example, presume the following:

The NIC and FC firmware images are independent in the adapter flash memory;
Only adapter-specific resets are needed for the new firmware image to be activated for the NIC and FC functions;
A firmware update may update just the NIC firmware image, just the FC firmware image, or both images;
Only the FC function will be used to update the firmware;
Resetting the NIC firmware does not automatically reset the FC function nor vice versa. However, as both the NIC and FC firmware can be updated via the FC driver associated with the FC function, the NIC firmware can also be reset via the FC driver;
The NIC and FC firmware can be updated simultaneously from any one function; and
Presume a firmware download is performed that updates just the FC firmware.

The following combination of attributes could be used to describe/define adapter 500 in this example:
UPDATE_SCOPE=ALL
WRITE=1
MIN_SIBLINGS=ANY An update sequence might result in the following messages communicated between update tool 328 and device driver 330 for adapter 500:

1. BEGIN message to Functions$_{0-3}$ to prepare for an update;
2. Only Function and Function$_3$ report via the WRITE_SPT bit that they allow firmware updates through those functions;
3. Update tool 328 chooses to send WRITE message to Function$_3$ to write the new firmware out to the adapter 500 (only FC firmware being updated);
4. RESET message sent to Functions$_{0-3}$ with RESET_TYPE=ADAP_SPECIFIC; 'hw_flags' indicate that the firmware update affected only FC functions; sequence count for each function: "1 of 4," "2 of 4," etc., also communicated as part of RESET;
5. Each FC function's driver instance performs a reset for that function; NIC functions inspect 'hw_flags' and recognize that firmware update does not affect them, so NIC functions skip the reset; and
6. DONE message to Functions$_{0-3}$ to conclude firmware download sequence.

Note that this embodiment accommodates different reset types and scopes via the RESET_TYPE and 'hw_flags' fields returned in the WRITE operation, thereby enabling precise update and reset operations in scenarios where the type of reset and the scope of functions requiring a reset can vary from one firmware update to the next.

Thus, in some embodiments, in operation, certain parameters can be set/defined for a particular adapter such that update tool 328 determines/identifies the set parameters in connection with a firmware update 332 and uses the defined parameters to control the firmware update process. In some embodiments, a dynamic information exchange may occur at runtime and/or during the firmware update process for the firmware update 332 between update tool 328 and driver 330 for the adapter such that the parameters defined for the adapter update are determined/identified at runtime for controlling the firmware update process.

Figure 6:
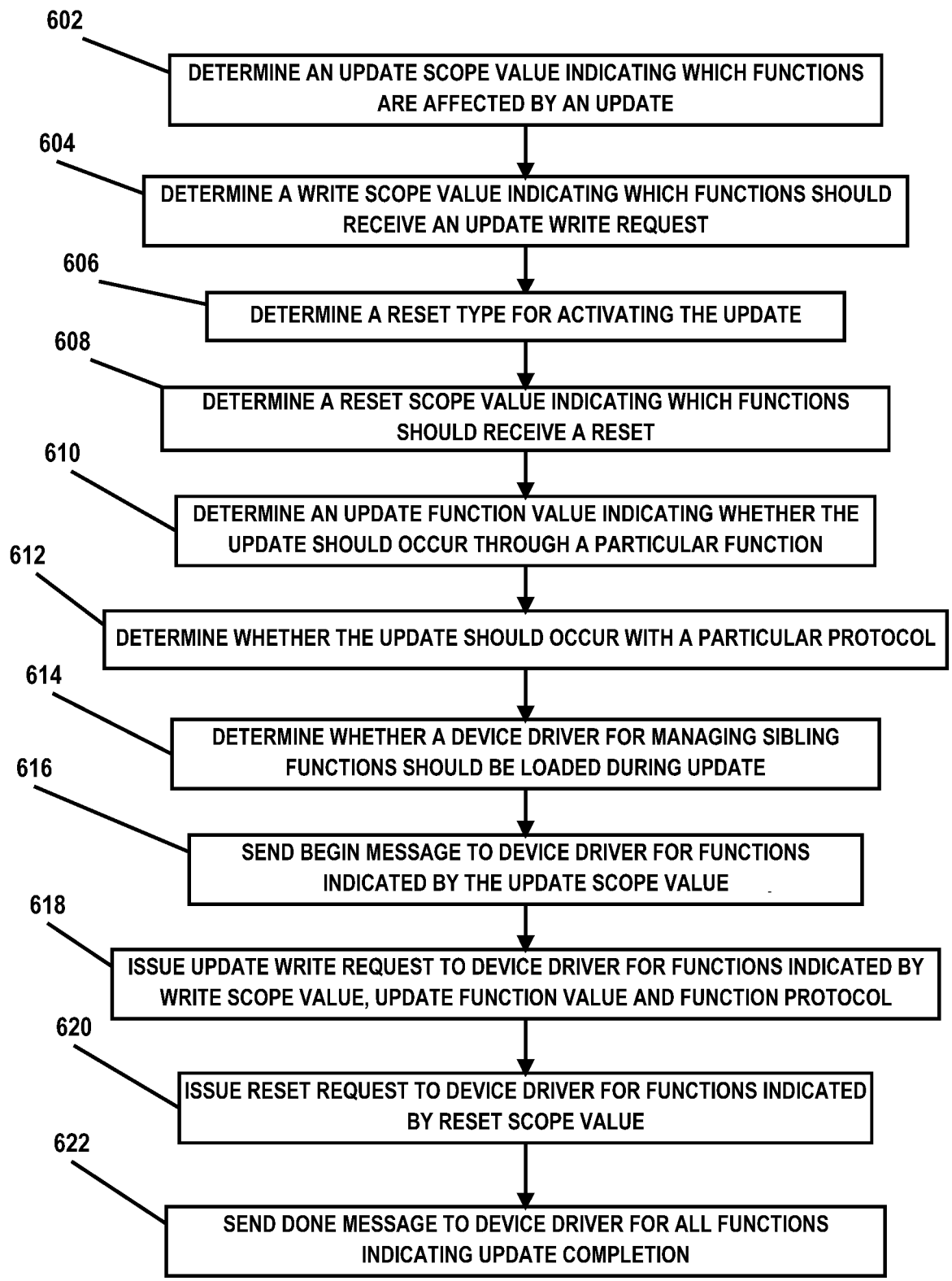
FIG. 6 is a flow diagram illustrating an embodiment of a method for updating firmware on a multi-protocol network adapter according to the present disclosure.

FIG. 6 is a flow diagram illustrating an embodiment of a method for updating firmware of a multi-protocol adapter using a unified update tool according to the present disclosure. The method begins at block 602, where update tool 328 determines an update scope value indicating which functions are affected by an update (e.g., by reading a configuration file or other data associated with firmware update 332). At block 604, update tool 328 determines a write scope value indicating which functions of the adapter should receive an update write request. At block 606, update tool 328 determines a reset type for the functions of the adapter for activating the update. At block 608, update tool 328 determines a reset scope value indicating which functions of the adapter should receive a reset. At block 610, update tool 328 determines an update function value indicating whether the update should occur through a particular function of the adapter. At block 612, update tool 328 determines whether the update should occur with a particular function/protocol.

At block 614, update tool 328 determines whether a device driver for managing sibling functions of the adapter should be loaded during the update. If so, update tool 328 may cause the device driver to be loaded. At block 616, update tool 328 sends a begin message to the adapter device driver for functions of the adapter indicated by the update scope value. At block 618, update tool 328 issues an update write request to the adapter device driver for functions indicated by write scope value, update function value and function protocol. At block 620, update tool 328 issues a reset request to the device driver for functions indicated by the reset scope value. At block 622, update tool 328 sends a done message to the device driver for all functions indicating update completion.

Figure 7:
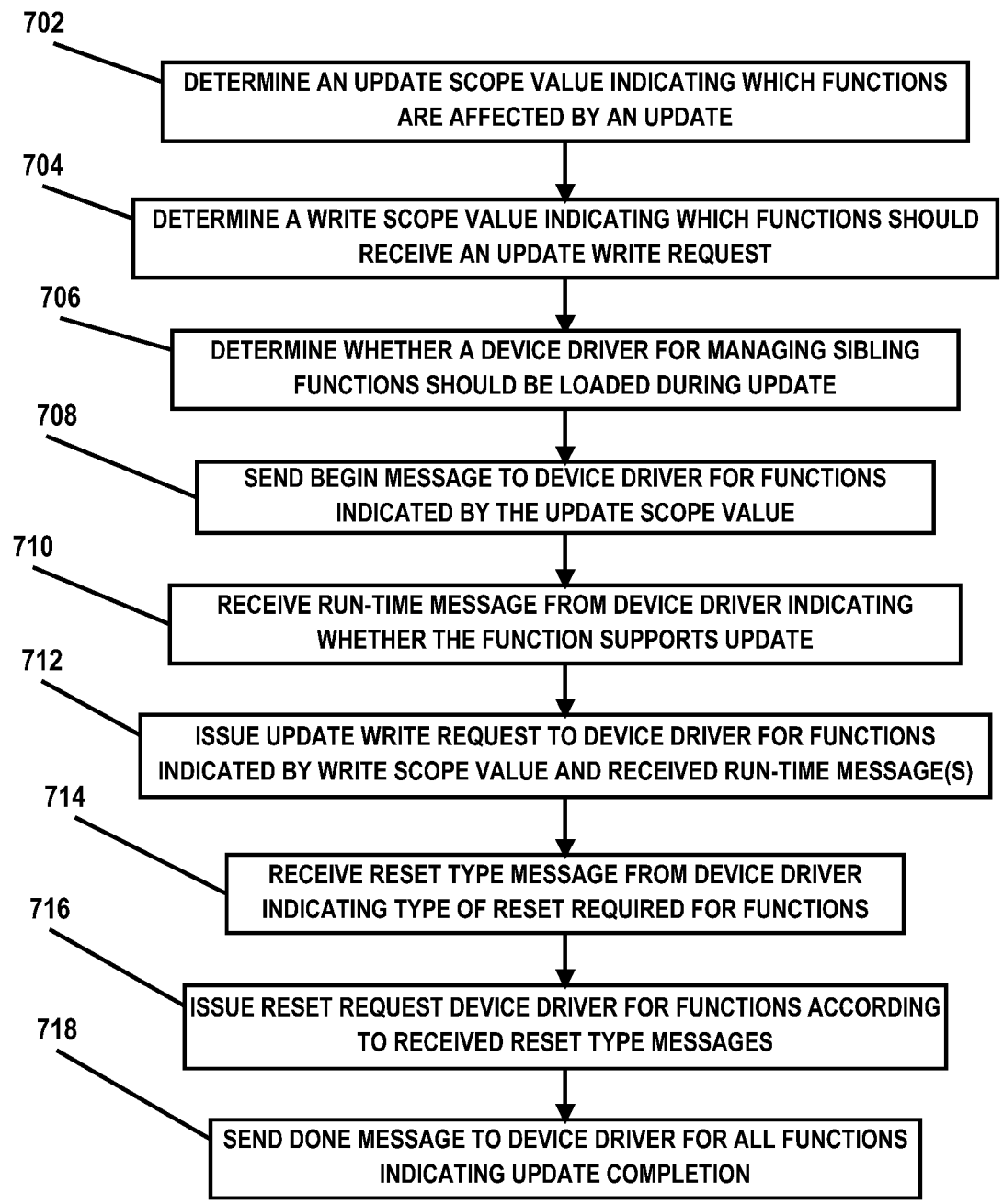
FIG. 7 is a flow diagram illustrating another embodiment of a method for updating firmware on a multi-protocol network adapter according to the present disclosure.

FIG. 7 is a flow diagram illustrating another embodiment of a method for updating firmware of a multi-protocol adapter using a unified update tool according to the present disclosure. The method begins at block 702, where update tool 328 determines an update scope value indicating which functions of the adapter are affected by an update. At block 704, update tool 328 determines a write scope value indicating which functions of the adapter should receive an update write request. At block 706, update tool 328 determines whether a device driver for managing sibling functions of the adapter should be loaded during the update. If so, update tool 328 may cause the device driver to be loaded. At block 708, update tool 328 sends a begin message to the adapter device driver for functions of the adapter indicated by the update scope value. At block 710, update tool 3289 receives a run-time message from the adapter device driver indicating whether the respective function supports a firmware update. At block 712, update tool 328 issues an update write request to THER adapter device driver for functions indicated by the write scope value and received run-time message(s).

At block 714, update tool 328 receive reset type message from the adapter device driver indicating the type of reset required by the respective functions. At block 716, update tool 328 issues reset requests to the adapter device driver for the respective functions according to the received reset type messages. At block 718, update tool 328 sends done messages to the device driver for all functions indicating update completion.

Thus, embodiments of the present disclosure provide a firmware update tool for updating firmware of a multi-protocol network adapter that is extensible to various combinations of update procedures. A number of defined parameters corresponding to the particular adapter and/or firmware update for the designated adapter may be read/determined by the update tool and used to control the process of updating the firmware on the adapter. The parameters may be statically defined and/or dynamically determined at firmware update/run-time.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
    reading, by an update tool executed by a processor unit of a host, parameter values for a firmware update of a multi-protocol network adapter, the parameter values specifying update procedures to conduct for different protocol classes of adapters of the multi-protocol network adapter, the parameter values indicating whether a device driver for managing the determined communication protocol functions is to be loaded for operation of the network adapter after the firmware update;
    determining, by the update tool, a reset type defining a type of reset needed to activate the firmware update on the network adapter based on the parameter values;
    sending, by the update tool, a message to the network adapter indicating that a firmware update process is beginning;
    sending, by the update tool, a write request to the network adapter to write the firmware update to select communication protocol functions; and
    sending, by the update tool, a reset request to select communication protocol functions to activate the firmware update using the reset type according to the parameter values.

2. The method of claim 1, wherein reading further comprises reading a parameter value indicating a reset scope defining select communication protocol functions to receive the reset request.

3. The method of claim 1, wherein reading further comprises reading a parameter value indicating whether the firmware update is to be processed via a select one of the communication protocol functions.

4. The method of claim 1, further comprising receiving, in response to the message indicating the beginning of the firmware update process, a message from the select communication protocol functions indicating whether the respective communication protocol functions support processing of the firmware update.

5. The method of claim 1, further comprising sending, by the update tool, a message to the network adapter indicating to the select communication protocol functions that the firmware update process is complete.

6. The method of claim 1, wherein reading further comprises reading a parameter value indicating whether the firmware update is to occur via a specific function number identifier of the network adapter.

7. A system, comprising:
    a multi-protocol network adapter; and
    a host having an update tool stored in a memory and executable by a processor unit of the host to update firmware on the adapter, the update tool executable by the processor unit to:
        read parameter values for a firmware update of the network adapter, the parameter values specifying function-specific update procedures to conduct for different protocol classes of adapters of the multi-protocol network adapter;
determine a reset type defining a type of reset needed to activate the firmware update on the network adapter based on the parameter values;
send a message to the network adapter indicating that a firmware update process is beginning;
send a write request to the network adapter to write the firmware update to select communication protocol functions; and
send a reset request to select communication protocol functions to activate the firmware update using the reset type according to the parameter values.

8. The system of claim 7, wherein the update tool is executable to read a parameter value indicating a reset scope defining select communication protocol functions to receive the reset request.

9. The system of claim 8, wherein the update tool is executable to read a parameter value indicating whether the firmware update is to be processed via a select one of the communication protocol functions.

10. The system of claim 7, wherein the update tool is executable to read a parameter value indicating whether the firmware update is to be processed via a select one of the determined communication protocol functions.

11. The system of claim 7, wherein the update tool is executable to receive, in response to the message indicating the beginning of the firmware update process, a message from the determined communication protocol functions indicating whether the respective communication protocol functions support processing of the firmware update.

12. The system of claim 7, wherein the update tool is executable to send a message to the network adapter indicating to the select communication protocol functions that the firmware update process is complete.

13. The system of claim 7, wherein the update tool is executable to read a parameter value indicating whether the firmware update is to occur via a specific function number identifier of the network adapter.

14. A computer program product for updating firmware on a multi-protocol network adapter, the computer program product comprising:
a non-transitory computer readable medium having computer readable program code embodied therewith, the computer readable program code comprising computer readable program code configured to:
read parameter values for a firmware update of a network adapter, the parameter values specifying update procedures to conduct for different protocol classes of adapters of the multi-protocol network adapter, the parameter values defining an adapter-specific sequence of update messages to be sent to the network adapter during the update procedure;
determine a reset type defining a type of reset needed to activate the firmware update on the network adapter based on the parameter values;
send a message to the network adapter indicating that a firmware update process is beginning;
send a write request to the network adapter to write the firmware update to select communication protocol functions; and
send a reset request to select communication protocol functions to activate the firmware update using the reset type according to the parameter values.

15. The computer program product of claim 14, wherein the computer readable program code is configured to read a parameter value indicating a reset scope defining select communication protocol functions to receive the reset request.

16. The computer program product of claim 15, wherein the computer readable program code is configured to read a parameter value indicating whether the firmware update is to be processed via a select one of the communication protocol functions.

17. The computer program product of claim 14, wherein the computer readable program code is configured to read a parameter value indicating whether the firmware update is to be processed via a select one of the determined communication protocol functions.

18. The computer program product of claim 14, wherein the computer readable program code is configured to receive, in response to the message indicating the beginning of the firmware update process, a message from the determined communication protocol functions indicating whether the respective communication protocol functions support processing of the firmware update.

19. The computer program product of claim 14, wherein the computer readable program code is configured to send a message to the network adapter indicating to the select communication protocol functions that the firmware update process is complete.

* * * * *